United States Patent [19]

Visco

[11] 4,364,193
[45] Dec. 21, 1982

[54] PORTABLE BLIND

[76] Inventor: John Visco, 334 Jeffer St., Ridgewood, N.J. 07450

[21] Appl. No.: 108,475

[22] Filed: Dec. 31, 1979

[51] Int. Cl.³ ............................................. A01M 31/02
[52] U.S. Cl. ......................................... 43/1; 135/16; 135/98
[58] Field of Search .................... 43/1; 135/1 R, 1 D, 135/2, 5 R, 5 B, 16, 35 R, 35 S; 108/48, 134; 89/36 R, 36 C, 36 F, 36 L; 109/49.5

[56] References Cited

U.S. PATENT DOCUMENTS

| | | | |
|---|---|---|---|
| 279,290 | 6/1883 | Von Der Wulbeke | 108/48 |
| 1,219,905 | 3/1917 | Barringer | 135/2 |
| 1,498,111 | 6/1924 | Nelsen | 135/1 D |
| 2,146,517 | 2/1939 | Thompson | 135/2 |
| 2,245,951 | 6/1941 | Agee | 108/48 X |
| 2,370,596 | 2/1945 | Wallace | 89/36 F |
| 2,533,322 | 12/1950 | Kober | 135/16 |
| 2,650,145 | 8/1953 | Sieminski | 108/48 |
| 2,863,467 | 12/1958 | Hearell | 135/2 X |
| 3,131,704 | 5/1964 | Shimon | 135/5 R |
| 3,151,621 | 10/1964 | Jackson | 135/16 |
| 3,217,722 | 11/1965 | Herse | 135/1 R |
| 3,540,170 | 11/1970 | Flowers | 43/1 X |

FOREIGN PATENT DOCUMENTS

| | | | |
|---|---|---|---|
| 1557380 | 3/1970 | Fed. Rep. of Germany | 135/1 R |
| 649287 | 11/1962 | Italy | 135/2 |
| 18749 | of 1903 | United Kingdom | 135/16 |

*Primary Examiner*—Stephen G. Kunin
*Assistant Examiner*—Robert P. Olszewski
*Attorney, Agent, or Firm*—Bachman and LaPointe

[57] ABSTRACT

The present disclosure is drawn to a blind and more particularly a portable blind of two piece construction which is easily and readily assembled on location. The portable blind comprises an umbrella portion and a skirt portion which, upon assembly, are fixedly secured together so as to form a unitary camouflaged enclosure.

11 Claims, 2 Drawing Figures

PORTABLE BLIND

BACKGROUND OF THE INVENTION

The present invention relates to hunting blinds or blinds used by nature watchers and more particularly a portable blind which is of simple construction and thereby readily and easily assembled on location.

Heretofore, the great majority of blinds used today to attract game and conceal the presence of a hunter or used by nature watchers and photographers are permanent installations and thus suffer from a number of disadvantages. Firstly, the fixed installation is incapable of being moved from location to location. It is highly desirable to be able to move the blind from place to place depending upon local game conditions. Secondly, due to the permanent nature of the structure it is necessary that the blind be constructed so as to withstand constant exposure to the elements. The foregoing requirements increases the overall cost of constructing the blind.

Accordingly, it is the principal object of the present invention to provide a blind which is readily portable and easily assembled on location.

It is a further object of the present invention to provide a portable blind which is of simple construction and inexpensive to manufacture.

Further objects and advantages of the present invention will appear hereinbelow.

SUMMARY OF THE INVENTION

In accordance with the present invention it has now been found that the foregoing objects and advantages may be readily obtained.

The present invention is drawn to a blind for concealing hunters, nature watchers or the like and more particularly a portable blind of two piece construction which is easily and readily assembled on location. The portable blind comprises an umbrella portion and a skirt portion which, upon assembly, are fixedly secured together so as to form a unitary camouflaged enclosure. The blind of the present invention is of simple construction, inexpensive to manufacture and readily moved from place to place.

BRIEF DESCRIPTION OF THE DRAWINGS

The present invention will be more readily understood from a consideration of the following illustrative drawings in which.

DETAILED DESCRIPTION

Figure 2:
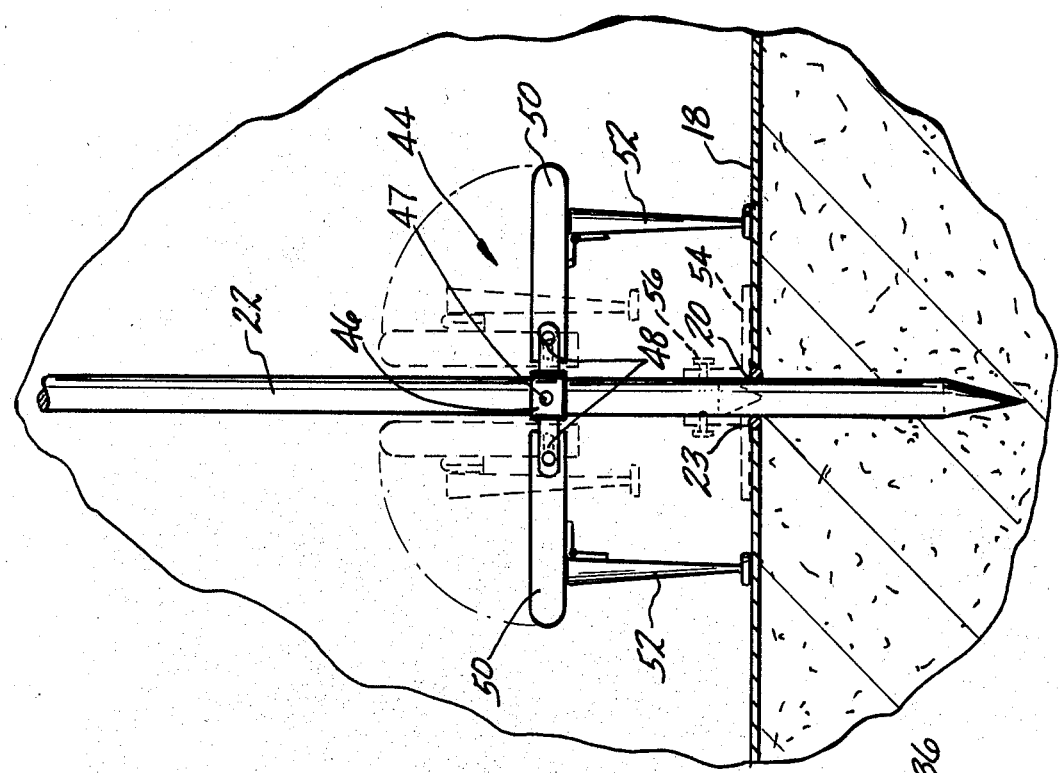
FIG. 2 is a perspective view of a seating assembly for supporting an occupant within the blind.
Figure 1:
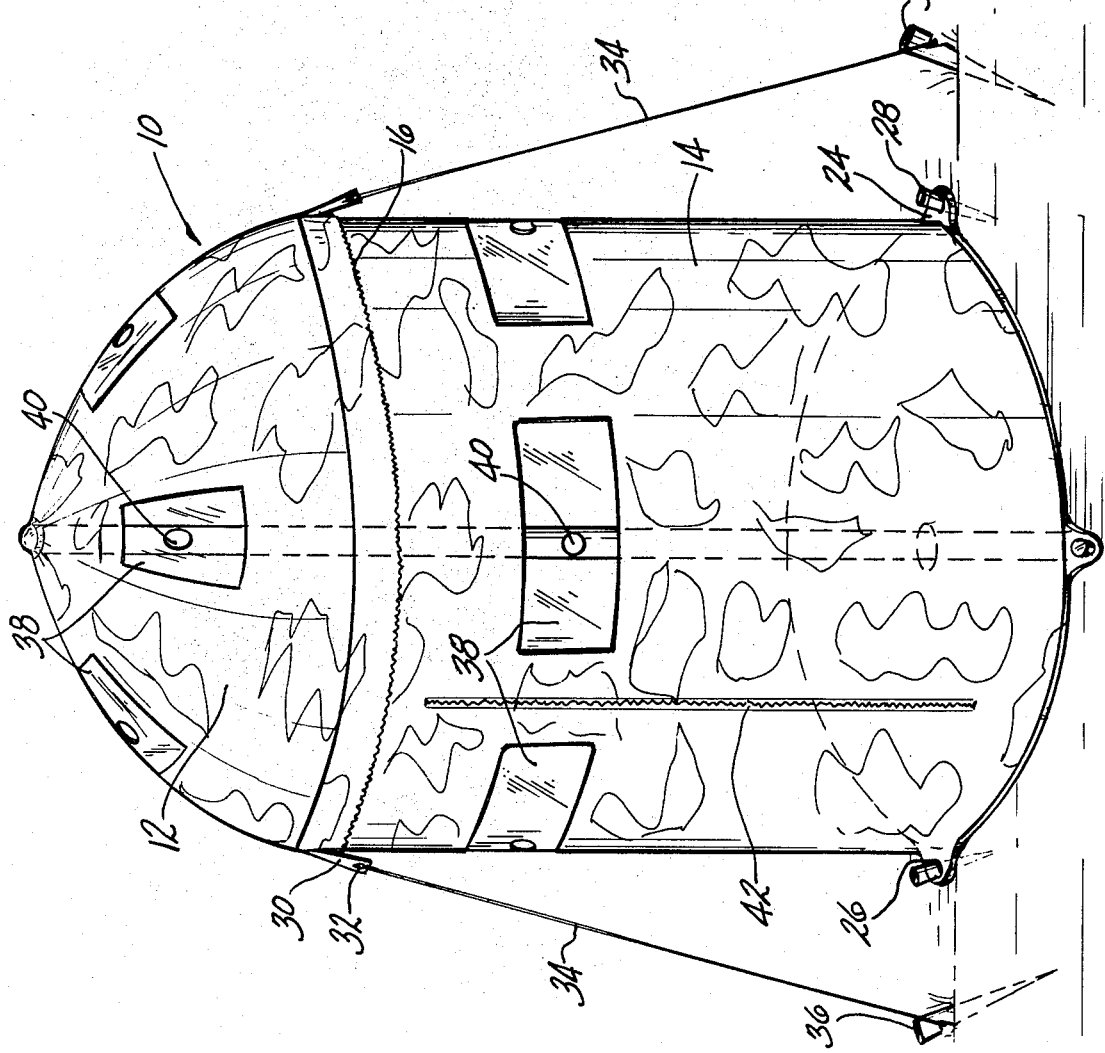
FIG. 1 is a perspective view of a blind according to the present invention.

Referring to FIGS. 1 and 2, a preferred embodiment of the present invention is illustrated wherein a blind 10 comprises an umbrella portion 12 and a skirt portion 14. The skirt portion 14 is secured to the circumferential edge 16 of umbrella portion 12 by any suitable means such as a zipper, VELCRO ®, hooks and eyes, clips, snaps or the like.

The construction of the ribs and rib mechanism of the umbrella portion 12 of the portable blind is typical of any normal patio type umbrella design. The covering for the umbrella portion 12 of the blind comprises a water resistant material such as nylon, plastic or the like and is provided with indicia, markings, colorings or the like so as to camouflage the presence of the blind while the blind conceals the presence of a hunter, nature watcher or the like. Likewise, the skirt portion of the blind is made of the same material as the covering of the umbrella portion and is provided with similar indicia, markings, colorings or the like so as to further conceal the presence of the blind.

A water repellent sheet 18 is secured to, by any suitable means, or integral with the skirt portion 14 of the blind and is provided with a cut-out portion 20 in the center thereof through which a support portion 22 of the umbrella portion passes so as to secure the support portion 22 of umbrella portion 12 into the ground. The edge of the water repellent sheet 18 defining the cut-out portion 20 is provided with a rubber grommet 23 or the like which seals against the support portion 22 of umbrella portion 12 so as to prohibit seepage of moisture from the ground through the cut-out portion 20 into the interior of the blind 10.

At the bottom of skirt portion 14 there is provided a plurality of eyelets 24 secured thereto each of which is provided with a through hole 26 through which stake means 28 is driven so as to secure the water repellent sheet 18 in a stationary position on the ground. In a similar manner, umbrella portion 12 of the blind is provided with a plurality of eyelets 30 having through holes 32 through which a tie down line 34 passes. The tie down line 34 is then secured to stakes 36 so as to further secure with support portion 22 the umbrella portion 12 of the blind 10 in place.

Both the umbrella portion 12 and the skirt portion 14 are provided with a plurality of removable plastic windows 38 secured in place in a similar manner as the skirt is attached to the umbrella portion in order to provide clear visibility for the hunter or nature watcher within the blind. As illustrated in FIG. 1 each of the windows 38 may be made of a transparent plastic material or the like and are provided with one or more gun ports 40 through which the hunter may pass his weapon. It should be appreciated that instead of a transparent plastic material or the like for the window portions 38 it is possible to provide the windows 38 with a one way viewing capability in a similar manner as a one way mirror or the like. In addition to the foregoing, the skirt portion 14 of the blind 10 is provided with one or more zippers 42 to allow easy access to the interior of the blind.

As best shown in FIG. 2, the support portion 22 of the umbrella portion 12 of the blind 10 supports a seat assembly 44 comprising a bracket 46 movable along the support portion 22 and releasably secured thereto by clamps 47. Bracket 46 is provided with a pair of U-shaped elements 48 each of which pivotably receives a seat element 50. The seats 50 are each provided with pivotable legs 52 to support the seats 50 when moved to their seating positions as illustrated in FIG. 2. When not seating, the seats 50 may be folded away as shown in phantom in FIG. 2.

In the event that the ground is too rocky and hard to allow for penetration of the ground by support portion 22 a flange assembly 54 is provided which, as can be seen in phantom in FIG. 2, is clamped to support portion 22 by bolt 56 so as to support portion 22.

The blind of the present invention is easily assembled on location and readily movable from place to place. In accordance with the present invention the sheet portion 18 of skirt portion 14 is located in position and secured in position by means of stakes 28 driven through through holes 26 in the plurality of eyelets 24. The umbrella portion 12 is then opened and the support portion 22 thereof is plunged through the cut-out portion 20. The umbrella portion is further secured in place by means of the tie down lines 34 which pass through the holes 32 in eyelets 30 and secured to stakes 36 driven into the ground. The skirt portion 14 is then raised and secured to the circumferential edge portion 16 of the umbrella portion 12 by means of a zipper, VELCRO ® hooks and eyes, clips, snaps or the like.

After completing assembly of the blind the hunter or nature watcher readily obtains access to the interior through the openings provided by the zippers 42 in the skirt portion 14 of the blind. The occupant is then free to observe the presence of game through the windows 38 provided in the skirt portion 14 and umbrella portion 12 of the blind. A hunter likewise is free to shoot the game by means of the gun ports 40 without the necessity of leaving or opening any portion of the hunting blind.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A portable hunting blind for concealing the presence of at least one hunter stalking game comprising an umbrella portion and a skirt portion, said umbrella having a support member and a collapsible member, said collapsible member being provided with first attachment means, said skirt portion having a first end located proximate to the ground and a second end located opposite said first end, said second end being provided with second attachment means for selectively attaching said skirt portion to said first attachment means on said collapsible member so as to form an enclosure wherein at least one of said skirt portion and said collapsible member further includes a plurality of transparent portions for allowing said at least one hunter inside said hunting blind to readily view the surrounding area for said game, at least one of said plurality of transparent portions being provided with at least one gun port for receiving a weapon for directing a volley of fire at said game.

2. A blind according to claim 1 wherein said collapsible member comprises a hinged rib element secured to said support member and further including a canopy fitted on said hinged rib element.

3. A blind according to claim 2 wherein said canopy is provided with said first attachment means.

4. A blind according to claim 1 wherein said skirt portion further includes a flooring sheet integral with said first end, said sheet having a cut-out through which said support member passes.

5. A blind according to claim 4 wherein said cut-out is provided with a seal for sealing against said support member.

6. A blind according to claim 1 wherein said support member includes means for pivotably mounting a seat, said seat being movable between a first position wherein said seat is retracted to a second position wherein said seat is supported on the ground.

7. A blind according to claim 1 further including a flange assembly selectively secured to the bottom of said support member for supporting said umbrella portion of said hunting blind when said support member is incapable of penetrating the ground.

8. A blind according to claim 7 wherein said flange assembly includes bolt means for securing said flange assembly to said support member.

9. A blind according to claim 6 wherein said means for pivotably mounting a seat comprises a hollow bracket adapted to receive said support member, said bracket being provided with a pair of U-shaped elements each adapted to pivotably receive a seat.

10. A blind according to claim 9 wherein said bracket is provided with clamp means for releasably securing said bracket to said support member.

11. A portable hunting blind for concealing the presence of at least one hunter stalking game comprising an umbrella portion and a skirt portion, said umbrella having a support member and a collapsible member, said collapsible member being provided with first attachment means, said skirt portion having a first end located proximate to the ground and a second end located opposite said first end, said second end being provided with second attachment means for selectively attaching said skirt portion to said first attachment means on said collapsible member so as to form an enclosure wherein said support member includes means for pivotably mounting a seat between a first position wherein said seat is retracted to a second position wherein said seat is supported on the ground, said means for pivotably mounting comprises a hollow bracket adapted to receive said support member, said bracket being provided with a pair of U-shaped elements each adapted to pivotably receive a seat, said pair of U-shaped elements being mounted on clamp means for releasably securing said bracket to said support member at a freely selected position along the length of said support member such that said seat is supported on said ground when in said second position.

* * * * *